(12) United States Patent
Sahasranaman et al.

(10) Patent No.: US 9,176,759 B1
(45) Date of Patent: Nov. 3, 2015

(54) MONITORING AND AUTOMATICALLY MANAGING APPLICATIONS

(75) Inventors: Vivek Sahasranaman, Bangalore (IN); Pankaj Risbood, Bangalore (IN); Parag Kacharulal Sarda, Bangalore (IN); Vittaldas Sachin Shenoy, Calicut (IN); Rohit Jain, Bangalore (IN)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/422,575

(22) Filed: Mar. 16, 2012

Related U.S. Application Data

(60) Provisional application No. 61/453,536, filed on Mar. 16, 2011.

(51) Int. Cl.
G06F 9/455 (2006.01)

(52) U.S. Cl.
CPC .................................. *G06F 9/45504* (2013.01)

(58) Field of Classification Search
None
See application file for complete search history.

(56) References Cited

U.S. PATENT DOCUMENTS

| | | | |
|---|---|---|---|
| 5,463,768 A | 10/1995 | Cuddihy et al. | |
| 6,598,179 B1 | 7/2003 | Chirashnya et al. | |
| 7,062,718 B2 | 6/2006 | Kodosky et al. | |
| 7,117,243 B2 | 10/2006 | Peart | |
| 7,650,331 B1 | 1/2010 | Dean et al. | |
| 7,653,833 B1 | 1/2010 | Miller et al. | |
| 7,761,573 B2 | 7/2010 | Travostino et al. | |
| 7,804,862 B1 | 9/2010 | Olson et al. | |
| 8,015,564 B1 * | 9/2011 | Beyer et al. | 718/100 |
| 8,516,478 B1 * | 8/2013 | Edwards et al. | 718/1 |
| 8,533,710 B1 * | 9/2013 | Long et al. | 718/1 |
| 2003/0212731 A1 * | 11/2003 | Brenner et al. | 709/105 |
| 2004/0139368 A1 | 7/2004 | Austen et al. | |
| 2005/0166011 A1 | 7/2005 | Burnett et al. | |
| 2006/0161753 A1 | 7/2006 | Aschoff et al. | |
| 2007/0199058 A1 | 8/2007 | Baumgart et al. | |
| 2007/0271604 A1 | 11/2007 | Webster et al. | |
| 2007/0280243 A1 | 12/2007 | Wray et al. | |
| 2008/0086515 A1 | 4/2008 | Bai et al. | |
| 2008/0205415 A1 | 8/2008 | Morales | |
| 2008/0301135 A1 * | 12/2008 | Alves et al. | 707/6 |
| 2009/0097657 A1 | 4/2009 | Scheidt et al. | |
| 2009/0199177 A1 | 8/2009 | Edwards et al. | |
| 2009/0222815 A1 | 9/2009 | Dake | |
| 2009/0241108 A1 | 9/2009 | Edwards et al. | |
| 2009/0249440 A1 | 10/2009 | Platt et al. | |
| 2009/0265707 A1 * | 10/2009 | Goodman et al. | 718/1 |
| 2009/0300605 A1 | 12/2009 | Edwards et al. | |
| 2010/0057913 A1 | 3/2010 | DeHaan | |
| 2010/0071035 A1 | 3/2010 | Budko et al. | |
| 2010/0153963 A1 * | 6/2010 | Kakarlamudi et al. | 718/105 |
| 2010/0199089 A1 | 8/2010 | Vysogorets et al. | |
| 2010/0199285 A1 * | 8/2010 | Medovich | 718/104 |
| 2010/0274890 A1 * | 10/2010 | Patel et al. | 709/224 |
| 2010/0281482 A1 * | 11/2010 | Pike et al. | 718/102 |

(Continued)

OTHER PUBLICATIONS

Abdull et al. "Generic Routing Encapsulation", [online] [retrieved on Jan. 4, 2011]. Retrieved from the Internet: <URL: http:/ / creativecommons. org/ licenses/ by-sa/ 3. 0/>, 5 pages.

(Continued)

*Primary Examiner* — Adam Lee
(74) *Attorney, Agent, or Firm* — Fish & Richardson P.C.

(57) ABSTRACT

This document generally describes techniques, methods, systems, and computer program products for monitoring and managing applications running on virtual machines (VMs).

20 Claims, 4 Drawing Sheets

(56) References Cited

U.S. PATENT DOCUMENTS

| | | | |
|---|---|---|---|
| 2011/0022812 | A1 | 1/2011 | Van Der Linden et al. |
| 2011/0023034 | A1* | 1/2011 | Nelson et al. ............. 718/100 |
| 2011/0035802 | A1* | 2/2011 | Arajujo et al. ............. 726/23 |
| 2011/0078303 | A1* | 3/2011 | Li et al. ............. 709/224 |
| 2011/0153838 | A1 | 6/2011 | Belkine et al. |
| 2011/0209160 | A1* | 8/2011 | Venkatachalam ............. 719/317 |
| 2011/0231280 | A1 | 9/2011 | Farah |
| 2011/0231855 | A1* | 9/2011 | Murata et al. ............. 718/103 |
| 2011/0289204 | A1* | 11/2011 | Hansson et al. ............. 709/224 |
| 2012/0102504 | A1* | 4/2012 | Iyer et al. ............. 719/318 |
| 2014/0040656 | A1* | 2/2014 | Ho et al. ............. 714/3 |

OTHER PUBLICATIONS

Amazon Auto Scaling—Getting Started Guide—API Version Aug. 1, 2010. Amazon Web Services LLC, 2010, 20 pages.

Amazon Auto Scaling—Developer Guide—API Version Aug. 1, 2010. Amazon Web Services LLC, 2011, 62 pages.

Amazon CloudWatch—Developer Guide—API Version Aug. 1, 2010. Amazon Web Services LLC, 2010, 75 pages.

Apache HTTP Server Version 2.0. "Log Files," 2011, [Retrieved on Feb. 15, 2011]. Retrieved from the Internet <URL: http://httpd.apache.org/docs/2.0/logs.html>, 7 pages.

Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.

Cala et al., "Automatic Software Deployment in the Azure Cloud", IFIP International Federation for Information Processing, 2010, pp. 1-14.

Chen, Per M., et al., : "Maximizing Performance in a Striped Disk Array", 17th Annual International Symposium on Computer Architecture (SIGARCH 1990), 18 pages.

Farinacci et al., "RFC 2784: Generic Routing Encapsulation (GRE)", Mar. 2000, The Internet Society, 10 pages.

Gowalla. "API Documentation—Oauth." [Retrieved on Apr. 26, 2011]. Retrieved from the Internet <URL: http://gowalla.com/api/docs/oauth>, 4 pages.

Hongkiat. "Amazon S3—The Beginner's Guide," 2011, [Retrieved on Apr. 26, 2011]. Retrieved from the Internet <URL: http://www.hongkiat.com/blog/amazon-s3-the-beginners-guide/>, 9 pages.

Benincosa. "Ganglia and Nagios, Part 2: Monitor enterprise clusters with Nagios—Install Nagios to effectively monitor a data center; make Ganglia and Nagios work together," 2009, 20 pages.

Kent et al., "RFC 4301: Security Architecture for the Internet Protocol", Dec. 2005, The Internet Society, 102 pages.

Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

Moller et al., "Internal Network Security", Feb. 1, 2000-May 18, 2001, Retrieved from the Internet: <URL: http://www.daimi.au.dk/~fwiffo/thesis/>, 183 pages.

MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.

Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.

'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.

'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.

OMG, Deployment and Configuration of Component-based Distributed Applications Specification—Version 4.0, OMG, 2006, pp. 1-160.

Primet et al.., "HIPCAL: State of the Art of OS and Network virtualization solutions for Grids", Sep. 14, 2007, 38 pages.

RSA Laboratories, "PKCS #11 v2.20: Cryptographic Token Interface Standard," Jun. 28, 2004, RSA Security Inc. (407 pages).

Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.

Travostino, Franco, et al., Seamless Live Migration of Virtual Machines over the MAN/WAN, 2006, Elsevier Future Generation Computer Systems 2006, 10 pages.

Vazhkudai, Sudharshan S., et al.; "Constructing Collaborative Desktop Storage Caches for Large Scientific Datasets"; ACM Journal Name, vol. V, No. N, Jun. 2006, 34 pages.

VMCI Datagram API [Retrieved on Jun. 8, 2011], Retrieved from the Internet: <URL: http://pubs.vmware.com/vmci-sdk/datagram.html>, 1 page.

VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.

VMCI Overview [Retrieved on Jun. 8, 2011] Retrieved from the Internet: <URL: http://pubs.vmware.com/vmci-sdk/VMCI_intro.html>, 3 pages.

VMCIDs_Lookup [Retrieved on Jun. 8, 2011], Retrieved from the Internet: <URL: http://pubs.vmware.com/vmci-sdk/functions/VMCIDs_Lookup.html>, 2 pages.

VMware vSphere [Retrieved on Jun. 8, 2011] Retrieved from the Internet: <URL: http://www.vmware.com/products/vmotion/overview.html>, 2 pages.

Wikipedia., Anycast [Retrieved on Oct. 10, 2011] Retrieved from the Internet: URL<http://en.wikipedia.org/wiki/Anycast>, 5 pages.

Wikipedia. "Domain Name System." [online] [Retrieved on Feb. 4, 2012]. Retrieved from the Internet <URL: http://en.wikipedia.org/wiki/Domain_Name_System> , 16 pages.

Wikipedia, "IPSec", [online] [retrieved on Jan. 4, 2011]. Retrieved from the Internet: <URL: http://en.wikipedia.org/wiki/Ipsec/>, 8 pages.

Wikipedia. "Oauth." [online] [Retrieved on Jan. 20, 2011]. Retrieved from the Internet <URL: http://en.wikipedia.org/wiki/Oauth> , 3 pages.

'Zabbix' [online]. "Zabbix 1.8: The Ultimate Open Source Monitoring Solution," 2001-2012, [retrieved on Feb. 3, 2011]. Retrieved from the Internet: URL: < http://www.zabbix.com/features.php.> 1 page.

* cited by examiner

US 9,176,759 B1

MONITORING AND AUTOMATICALLY MANAGING APPLICATIONS

CROSS-REFERENCE TO RELATED APPLICATIONS

This application claims priority under 35 U.S.C. §119(e)(1), to U.S. Provisional Application Ser. No. 61/453,536 filed on Mar. 16, 2011, the entire contents of which is incorporated herein.

TECHNICAL FIELD

This document generally describes techniques, methods, systems, and computer program products for monitoring and managing applications running on virtual machines (VMs).

BACKGROUND

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in VMs.

SUMMARY

This document generally describes monitoring and automatically managing instances of applications that are running on one or more VMs. For example, if one more instances of an application that are running on one or more VMs are experiencing a high volume of user requests, a computer system can respond by instantiating additional instances of the application on existing or new VMs so as to assist with the user requests.

The details of one or more embodiments are set forth in the accompanying drawings and the description below. Various advantages can be provided by the disclosed systems and methods. For example, performance degradations of applications running on VMs can be more quickly and accurately identified. In another example, adjustments to application and VM deployments can be made more responsive to actual user demand, instead of having to guess at a potential cause of fluctuations in metrics like CPU and memory usage.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
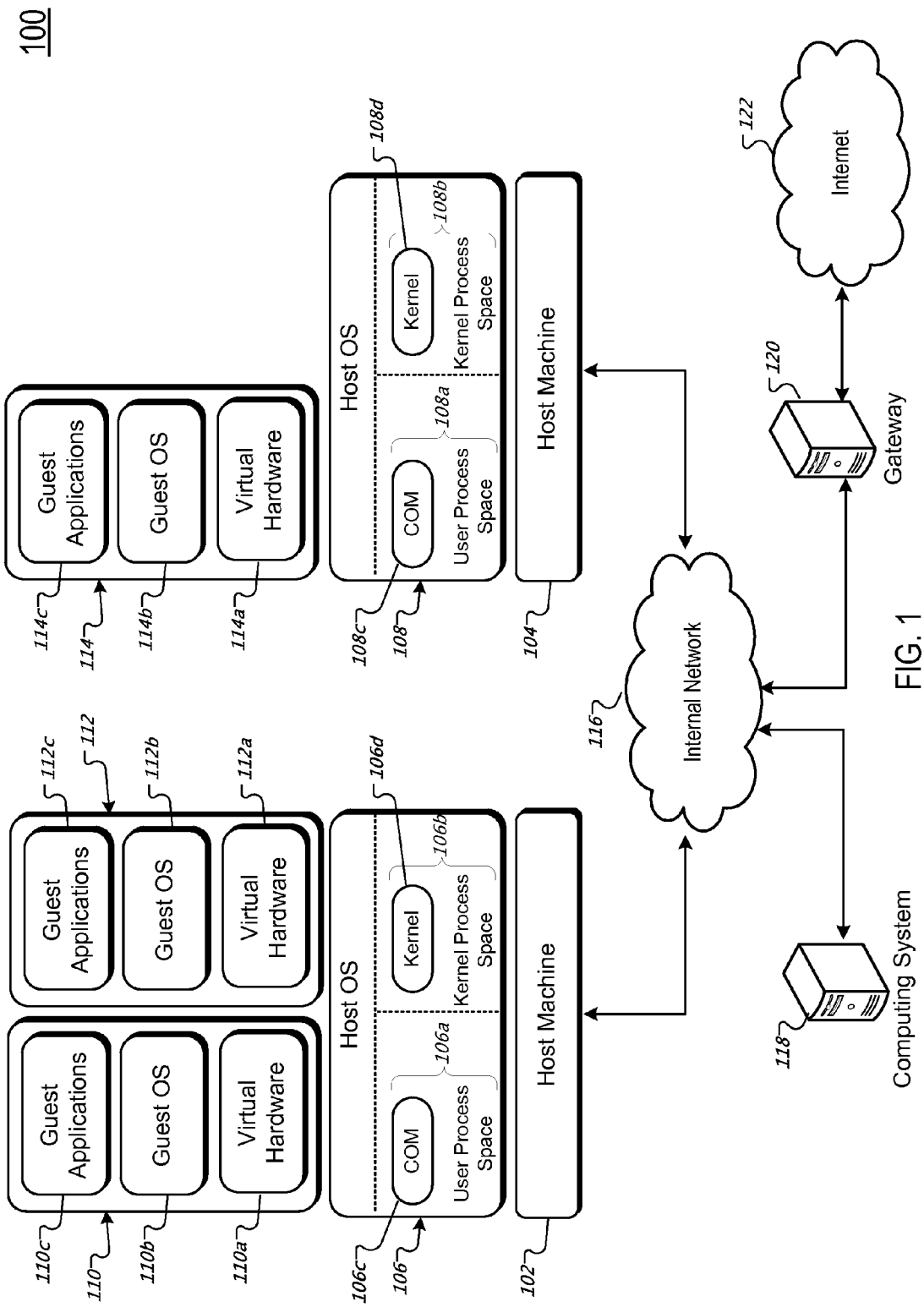
FIG. 1 is a schematic illustration of an example VM system.

This document generally describes techniques, methods, systems, and computer program products for monitoring and automatically managing applications running in a virtual environment, such as on a VM. A VM is itself an application that runs on a host machine (e.g., a computer server) and that provides a simulated version of the underlying host machine hardware, or a different computer architecture (e.g., a VM running on a Solaris server may simulate the Solaris server, a PC, or any other hardware). A host machine can include a host operating system (OS) that manages VMs running on the host machine. A host machine can run any number of VMs concurrently, such as a portion of a VM (e.g., a VM distributed over multiple host machines), one VM, and multiple VMs. Each VM can be executed on a host machine in a separate environment that is isolated from other VMs running on the host machine. Such separate environments can be referred to as sandboxes or containers. A VM can run a variety of applications using the virtualized hardware that is provided by the VM, such as a web server application that serves requests for web accessible documents from client devices.

Various techniques have been used to monitor the performance of VMs, such as host-level monitoring of processing cycles and memory used by a VM on a host machine. For example, a host machine running a VM can monitor the number of cycles of one or more central processing units (CPUs) of the host machine that are used for operation of the VM. Host-level statistics have been used to determine the status of a VM (e.g., VM is overloaded), which can serve as a basis for increasing or decreasing the number of VMs that are handling a particular task, such as serving documents for a website (e.g., www.example.com).

However, such host-level statistics can serve as an inaccurate performance metric for determining whether to increase or decrease a number of VMs performing various tasks. For instance, fluctuations in CPU usage by a VM can be caused by a variety of things that may be unrelated to the VM's performance with regard to a particular task. For example, a VM that is running a web server application may use more CPU cycles to serve a greater volume of client requests, but such an increase in CPU usage does not necessarily mean that the web server application has experienced a degradation in performance (e.g., an increase in response latency). Instead, the web server can have an average response latency during periods of high request volume (when CPU usage may increase) that is substantially the same as an average response latency during periods of low request volume (when CPU usage may decrease). CPU usage by a VM can also change for reasons unrelated to a particular application. For instance, the VM itself and/or other applications running on the VM may cause fluctuations in CPU usage by the VM. Using host-level statistics, such as CPU usage, can provide an inaccurate indication as to the performance of a VM and/or the applications running on the VM.

This document describes techniques, methods, systems, and computer program products for more accurately monitoring application performance on VMs and for more precisely managing VM and application deployment to meet various performance criteria. In particular, application-level data for applications running on VMs can be obtained and used to manage application and VM distribution across various host machines, and to detect anomalies that may indicate errors in host machines, VMs, and/or applications. Application-level data can more accurately indicate the performance of VMs and/or applications running on VMs than host-level statistics.

For instance, if the average latency for a web server application increases to a point where it exceeds a predetermined threshold (e.g., average latency is greater than 100 μs), a determination can be made that the web server application is overloaded with requests and that additional web server applications should be instantiated to assist with incoming client requests. Accordingly, this performance degradation can be remedied by automatically instantiating additional VMs across one or more host machines to run additional web server applications, which can decrease the request load for each web server application and allow for incoming client requests to be more quickly served. In contrast, host-level statistics (e.g., CPU usage) may not provide an indication that the web server application is overloaded (e.g., CPU usage may not spike when the average latency is around a predetermined threshold level), or may provide an indication that can be attributed to any of a variety of sources, such as a VM itself and other applications running on a VM.

Application-level data that is obtained and used can vary depending on the particular application for which the data is collected. For example, application-level data for a frontend application (e.g., web server application) can include data that provides an indication of how the frontend application is performing its particular tasks (e.g., serving client requests). For instance, data collected for frontend applications can include data regarding request latency (amount of time it takes to serve a request), request volume (e.g., number of request per second), an amount of data transferred per request (e.g., bytes transferred per request), and a rate at which errors are encountered by the web server application (e.g., one error encountered per every one thousand requests). In another example, data obtained for a backend applications (e.g., database applications) can include data regarding a number of "expensive queries" (queries that take longer than a threshold amount of time to run) over a given time period.

Application-level data can be obtained through the configuration of VMs to use of agents and application specific plugins to collect application-level data and to report the collected application-level data to a computing system that is external to the VMs. As used herein, "plugin" is a broad term, encompassing its plain and ordinary meaning, including, but not limited to, a portion of code that is constructed to communicate with a particular application (e.g., using one or more application programming interfaces (APIs) of the particular application). Plugins can communicate with applications to obtain performance-related data from the applications, such as the amount of time the application has recently taken to perform various tasks that are specific to the applications.

As used herein, the term "agent" is a broad term, encompassing its plain and ordinary meaning, including, but not limited to, a portion of code that is deployed inside a VM (as part of the OS and/or as an application run by the OS) to manage collection of application-level data by plugins. An agent can direct plugins to run and collect data from applications within a VM, and can receive the collected data from the plugins. An agent can provide collected application-level data to a computing system that is configured to receive, aggregate, and analyze application-level data from agents deployed across various VMs and/or host machines. An agent can provide application-level data obtained from application monitoring on a VM to a computing system using a standard API and with appropriate authentication so as to notify the computing system that the data is coming from a particular VM.

A computing system can include one or more computing devices. The phrase "computing device" as used herein encompasses its plain and ordinary meaning, including, but not limited to computer servers, desktop computers, laptop computers, and/or distributed computing systems. Computing systems can receive application-level data from agents over time and can store such data with time coding information (e.g., timestamps) so as to provide time series data. Computing systems can be configured to manage the instantiation of VMs and applications on various host machines. Management of VMs and applications can include providing a VM with configuration information that the VM and/or agents can use to run a user defined set of applications and/or plugins, and to obtain user specified application-level data from particular applications.

Using data received from agents, computing systems can monitor for various conditions and/or events associated with applications, such as performance degradations, with user specified triggers. Triggers can include rules and/or conditional statements that are run by a computing system on time series data for applications and that, when satisfied, can indicate that a particular condition exists within applications and/or VMs. For example, a trigger can be used to identify when the average latency over the last two minutes across instances of a particular application running on various VMs is greater than 100 μs. Satisfaction of this example trigger can be used by the computing system to identify when the instances of the particular application are more heavily loaded than normal. Triggers can be user defined and configurable in any of variety of formats, such as a Boolean statement that uses application-level data variables (e.g., average request latency).

A trigger can be associated with one or more actions that, when the trigger is satisfied, are performed by a computing system. For example, if the example trigger discussed above regarding the average latency exceeding 100 μs is satisfied, the computing system can cause more instances of the particular application being monitored to be spawned, but at a rate of not more than two instances per minute (this is an example of an action). In another example, if the number of requests served per second average across all the particular application falls below one per second for over five minutes (this is an example of a trigger), a computing system can reduce the number of instances of the particular application by one instances per minute (this is another example of an action). Such a trigger and action framework can permit the computing system to automatically scale VM and application deployment so as to efficiently meet present computational demands.

A computing system can additionally use the time series data from applications to automatically detect anomalous events, such as hardware and/or software errors that may require an application, VM, and/or host machine to be reset and/or repaired. Computing systems can also correlate application-level data to other variables that may offer some kind of reasoning as to the cause of an anomalous event. For example, a sudden spike in latency from a frontend application can be detected and correlated to a sudden increase in hard disk access latency on a host machine.

FIG. 1 is a schematic illustration of an example virtual machine system 100. The system 100 includes one or more host machines such as, for example, host machine 102 and host machine 104. Generally speaking, a host machine is one or more data processing apparatus such as a rack mounted servers or other computing devices. The data processing apparatus can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine executes a host operating system or other software that virtualizes the underlying host machine hardware and manages concurrent execution of one or more virtual machines. For example, the host operating system 106 is managing virtual machine (VM) 110 and VM 112, while host OS 108 is managing a single VM 114. Each VM includes a simulated version of the underlying host machine hardware, or a different computer architecture. The simulated version of the hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system. There can be a single communication process for all VMs executing on a host machine or multiple communication processes, one for each VM executing on a host machine. In yet further implementations, some portion of the communication process executes in the user process space and another portion executes in the kernel process space.

Each of the VMs 110, 112, and 114 can include various mechanisms for obtaining performance statistics for the applications 110c, 112c, and 114c, as described in greater detail with regard to FIG. 2 below. For example, application plugins can collect performance statistics the applications 110c, 112c, and 114c and provide the performance statistics to agents running on (or as part of) the guest operating systems 110b, 112b, and 114b. The agents can package (e.g., add metadata identifying an application, VM, and/or host machine associated with the performance statistics) and report collected performance statistics to a computing system 118. The computing system 118 can be a virtual computing device (e.g., a VM) and/or a physical computing device (e.g., a rack mounted server) that collects and evaluates the performance statistics for the applications 110c, 112c, and 114c running on VMs 110, 112, and 114. The computing system 118 can evaluate application performance using various triggers and associated actions. Triggers can be evaluated for individual instances of an application (e.g., the application 110c) and/or for collections of application instances (e.g., the applications 110c, 112c, and 114c).

Figure 2:
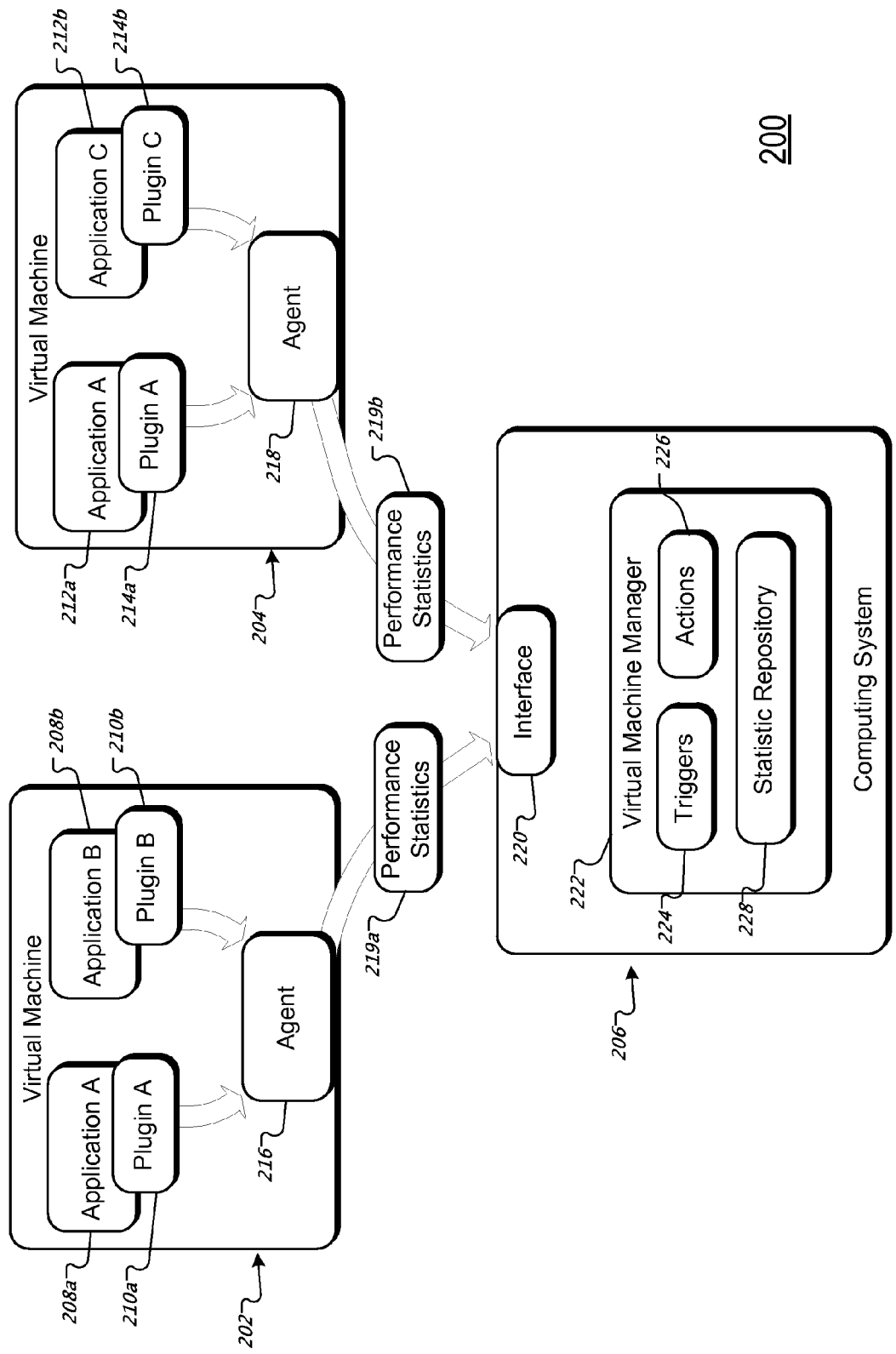
FIG. 2 is a schematic illustration of an example VM system.

FIG. 2 is a schematic illustration of an example virtual machine system 200. The system 200 depicts a computing system 206 (similar to the computing system 118 described above with regard to FIG. 1) monitoring and automatically managing VMs 202 and 204 (similar to the VM 110, 112, and 114 described above with regard to FIG. 1).

Similar to the VMs described above with regard to FIG. 1, the VMs 202 and 204 can run any of number of applications. For example, the VM 202 is depicted as running instances 208a-b of applications A and B, and the VM 204 is depicted as running instances 212a-b of applications A and C. The applications A-C can be any of a variety of applications, such as web server applications and database applications. As demonstrated by instances 208a and 212a of application A, the VMs 202 and 204 can run concurrent and redundant instances of the same application.

Each of the applications 208a-b and 212a-b can have one or more associated plugins that are running on the respective VMs 202-204. For instance, plugins 210a-b are running in association with application instances 208a-b, and plugins 214a-b are running in association with application instances 212a-b. Plugins include code that interacts with an application through a variety of mechanisms, such as a common application programming interface (API). Plugins can add additional features and/or functionality to an application without having to directly alter the application. For example, the plugin 210a can collect and report statistics regarding operations performed by the instance 208a of application A, such as a number of requests received by the application instance 208a over a period of time and an average amount of time the application instance 208a took to process the received requests.

The plugins 210a-b and 214a-b can interact with and/or obtain information from applications 208a-b and 212a-b through on one or more services that the applications make available to the plugins. A service includes one or more processes of an application that receive and process requests from plugins communicated according to an associated API. For example, the plugin 210a can request that a service for application 208a provide an indication when a request is received by the application 208a and an indication when a response is provided by the application 208a. Based on such a request, the service can provide notifications to the plugin 210a when requests are received and responses are provided by the application 208a. Information provided to plugins by application services can include indicators of various events (e.g., request received) that a plugin may timestamp and use to generate various performance statistics. Information provided to plugins can also include various performance statistics that are calculated by an application and/or its associated plugin service.

The VMs 202 and 204 include agents 216 and 218, respectively, that are configured to receive performance-related information (e.g., performance statistics, indicators of various events for an application) from the plugins 210a-b and 214a-b. The agents 216 and 218 can be code that is running on and/or part of an operating system for the VMs 202 and 204 (e.g., the guest operating systems 110b, 112b, and 114b). The agents 216 and 218 can collect performance-related information from the plugins 210a-b and 214a-b, respectively, and provide updates regarding the performance of the applications 208a-b and 212a-b (and/or the VMs 202 and 204) to the computing system 206. Such updates can be provided to the computing system 206 in a variety of ways, such as continuously (e.g., forward performance information as it is received from plugins), at various timed intervals (e.g., every second, every 10 seconds), and/or as triggered by various events on the VMs 202 and 204 (e.g., response to a client request completed).

The agents 216 and 218 can receive processed performance statistics from the plugins 210a-b and 214a-b, and/or they can process performance-related information received from the plugins 210a-b and 214a-b. For example, the agents 216 and 218 can aggregate information received from the plugins 210a-b and 214a-b over a period of time before sending the information as performance statistics to the computing system 206. Performance statistics can include a variety of information regarding various aspects of the performance of the applications 208a-b and 212a-b. For instance, performance statistics can indicate a current request load being handled by one or more applications and/or a current level of efficiency with which one or more applications are processing requests. For example, performance statistics can include: information indicating a number of requests received by an application over a period of time (e.g., one second, one minute); information indicating an average latency for an application to process received requests over a period of time; information indicating an average amount of data transferred (e.g., kilobytes, megabytes) by an application per received request over a period of time; information indicating a number of errors encountered by an application over a period of time; information indicating a number of items that are currently pending in a task queue for an application to process; indicating a number of tasks from a task queue that are performed by an application over a period of time; and/or information indicating a number of operations (e.g., database queries) taking more than a threshold amount of time to process that are performed by an application over a period of time. Other performance statistics can also be used and provided to the computing system 206 by the agents 216 and 218.

The agents 216 and 218 can add various metadata to performance statistics before they are provided to the computing system 206, such as information that identifies an application (e.g., identifying instance 208a of application A) and/or a VM (e.g., VM 202). The agents 216 and 218 can provide performance statistics 219a and 219b, respectively, to the computing system 206.

The computing system 206 receives the performance statistics 219a-b from the VMs 202 and 204 through an interface 220 (e.g., a network interface) and provides the performance statistics to a virtual machine manager 222. The virtual machine manager 222 can be any of a variety of computing modules (e.g., hardware, software) that is executed on the computing system 206. The virtual machine manager 222 uses the received performance statistics to monitor the performance of the VMs 202 and 204, and their associated applications 208a-b and 212a-b. The virtual machine manager 222 uses triggers 224 to determine when to perform various actions 226 with regard to the VMs that the manager 222 is monitoring, which in the present example include VMs 202 and 204. The triggers 224 include threshold conditions that, when satisfied, indicate a problem of some sort that the manager 222 may be able to remedy or alleviate through one or more of the actions 226. The triggers can be application specific. For instance, there can be particular triggers that apply to the application A that are different from triggers that are applied to application B. The triggers can be applied to individual application instances (e.g., instance 208a of application A) and/or to particular groups of the application instances (e.g., application A instances running on particular host devices, to all application A instances). Triggers can also be applied across applications. For example, a trigger can be applied to performance statistics for all frontend applications, to all applications running on a particular VM, and/or to all applications running on a particular host device, which may be running multiple VMs.

The triggers 224 can be used to identify various conditions. For example, the following trigger can be used to identify when a high error rate has been encountered for frontend applications: average(sum(errors_per_second, <all frontend applications>)/sum(requests_per_second, <all frontend applications>)) over 60 seconds>50%. Such a trigger may indicate that anomalous behavior is occurring with one or more frontend applications, one or more VMs that are running the frontend applications, and/or one or more host devices that are running the VMs. The virtual machine manager 222 may apply one or more triggers 224 to identify the source of the anomaly and then apply one or more of the actions 226 to the identified entity, such as restarting and/or rebooting the entity.

In another example, satisfaction of the following trigger may indicate that instances of application A should be scaled-up (increased): average(latency_per_request, <application A>) over 5 minutes>100 ms. In response to determining that such an example trigger has been satisfied, the computing system 206 can perform one or more of the actions 226 that causes one or more instances of application A to be launched in one or more VMs.

The virtual machine manager 222 can store performance statistics in a statistic repository 228. Stored performance statistics can be timestamped and used to perform time-based monitoring of the VMs 202 and 204. Time-based monitoring can be used to detect performance changes overtime. As indicated above, the triggers can examine various performance statistics over various time ranges (e.g., last 60 seconds, last 5 minutes, last 60 seconds compared with average value over 60 second period).

Figure 3:
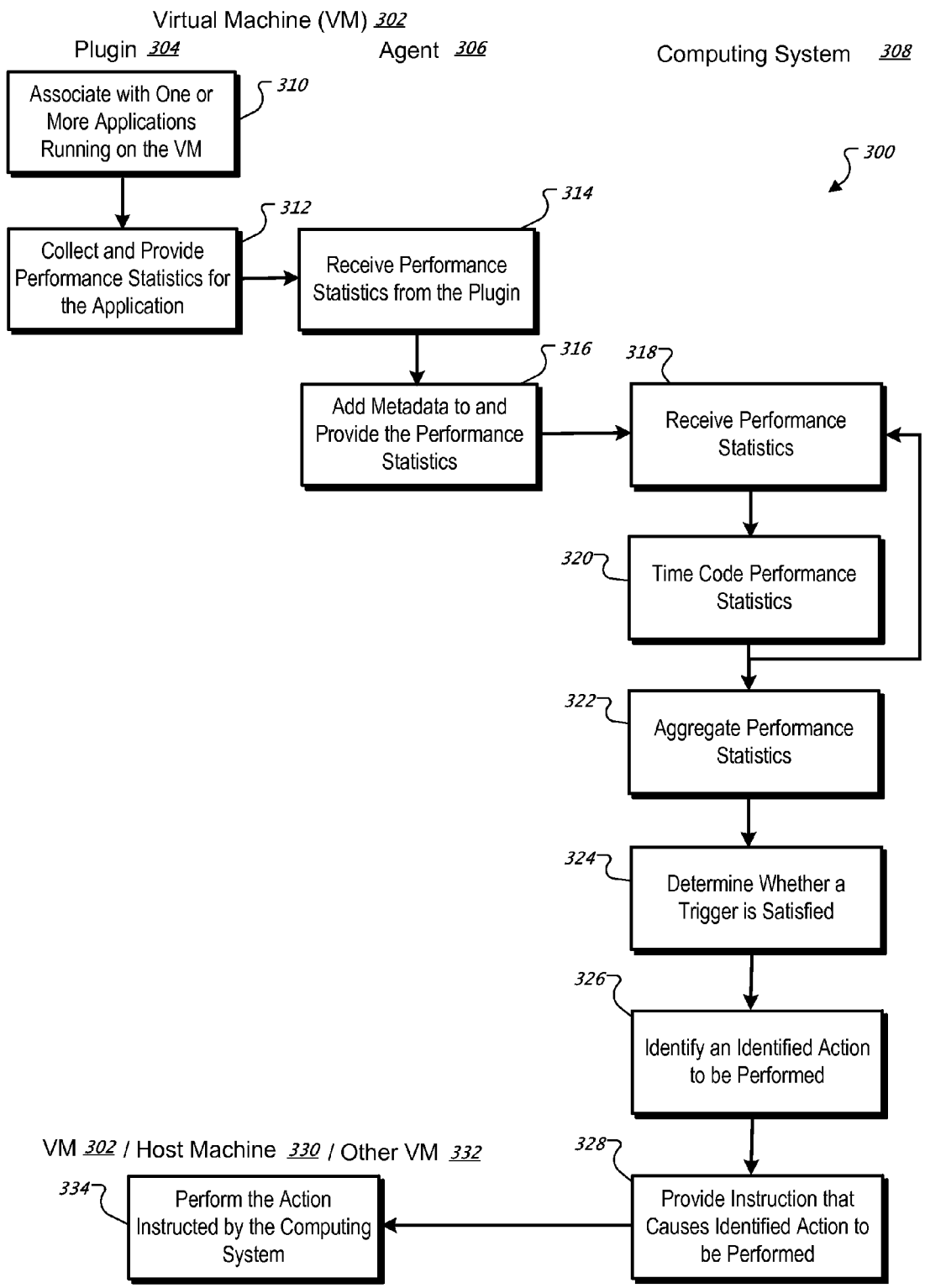
FIG. 3 is a flowchart of an example technique for monitoring and managing VMs.

FIG. 3 is a flowchart of an example technique 300 for monitoring and managing VMs. The example technique 300 is depicted as being performed in part by a VM 302 that includes a plugin 304 and an agent 306, and also being performed in part by a computing system 308. The VM 302 can be any of a variety of appropriate VM, such as the VMs 110-114 described above with regard to FIG. 1 and/or the VMs 202-204 described above with regard to FIG. 2. The plugin 304 can be associated with an application that is running on the VM, such as the plugin 210a that is associated with the application 208a that is running on the VM 202. The plugin 304 can be similar to the plugins 210a-b and/or 214a-b described above with regard to FIG. 2. The agent 306 can be similar to the agents 216-218 described above with regard to FIG. 2. The computing system 308 can be any of a variety of appropriate computing device(s), such as the computing system 118 described above with regard to FIG. 1, and/or the computing system 206 described above with regard to FIG. 2.

At 310, the plugin 304 associates with one or more applications that are running on the VM 302. For example, the plugin 304 can provide a request to receive performance information to a particular instance of an application that is running on the VM 302. For example, the plugin 210a can provide a request to the application A 208a to receive particular performance information from the application A 208a. In some implementations, the plugin 304 can be associated with an application when the plugin 304 is instantiated by the VM 302.

The plugin 304 can collect and provide performance statistics for the application with which the plugin 304 is associated (312). For example, as discussed above, the plugin 210a can collect performance statistics for the application 208a and can provide the performance statistics to the agent 216. The performance statistics can be provided as they are obtained by the plugin 304 and/or they can be aggregated by the plugin 304 and provided at various time intervals to the agent 306.

The agent 306 can receive the performance statistics from the plugin 304 (314). The agent 306 can add metadata to the performance statistics and can provide the performance statistics with metadata to the computing system 308 (316). For example, the agent 306 can add metadata that identifies the application to which the performance statistics pertain and/or the VM 302 that is running the application. As discussed above, the agent 306 can provide the performance statistics to the computing system 308 as they are received and/or can collect the performance statistics and provide them in batches at various intervals of time.

At 318, performance statistics are received by the computing system 308. For example, performance statistics can be received for an application running on the VM 302, such as the applications A-B 208a-b that are running on the VM 202 and/or the applications A and C 212a-c that are running on the VM 204. Performance statistics can be provided to the computing system 308 using the plugin 304 associated with the application and the agent 306 running on the VM 302. For example, performance statistics for the application A 208a running on the VM 202 can be obtained by the plugin 210a and provided to the agent 216 on the VM 202. The agent 216 can, at various intervals of time and/or in response to various events related to the application A 208a running on the VM 202, provide the performance statistics 219a to the computing system 206, which can receive the performance statistics 219a using the interface 220.

As described above, performance statistics received by the computing system 308 can include any of a variety of information regarding the operation of one or more applications on the VM 302, such as information indicating a number of requests received by an application over a period of time, information indicating an average latency for an application to process received requests over a period of time, information indicating an average amount of data transferred by an application per received request over a period of time, information indicating a number of errors encountered by an application over a period of time, information indicating a number of items that are currently pending in a task queue for an application and/or information indicating a number of tasks from the task queue that were performed by an application over a period of time, information indicating a number of operations (e.g., database queries) taking more than a threshold amount of time to process that are performed by an application over a period of time, or any combination thereof.

The received performance statistics can be time coded (e.g., associated with a timestamp) when they are received (320). The time coding can be used to identify performance statistics that have been received over one or more periods of time. For example, the computing system 206 can identify performance statistics received over a period of time for one or more of the applications 208a-b and/or 212a-b to determine whether one or more of the triggers 224 have been satisfied and whether one or more of the associated actions 226 should be performed.

Performance statistics can be repeatedly received (318) and time coded (320) by the computing system 308 and, at various times (e.g., in response to a period of time having elapsed, in response to an event occurring), can aggregate the performance statistics for analysis (322). For example, performance statistics for all instances of a particular application (e.g., application A 208a running on VM 202 and application A 212a running on VM 204) can be aggregated by the computing system 308 to determine whether the particular application should be scaled-up (number of instances increased), scaled down (number of instances decreased), left at its current level, and/or whether anomalous behavior is being experienced that may require one or more instances to be restarted/rebooted. In another example, performance statistics for a particular instance of an application (e.g., application A 208*a* running on VM 202) and/or a particular VM (e.g., VM 202) can be aggregated over a period of time (e.g., previous 5 minutes, 10 minutes, 20 minutes, 30 minutes, 45 minutes, 1 hour) and compared with previous aggregations of performance statistics to determine how performance has changed over time (e.g., improved performance, degraded performance).

The computing system 308 can determine whether the received performance statistics satisfy one or more triggers (324). For example, the computing system 206 can determine whether the aggregated performance statistics satisfy one or more of the triggers 224. In another example, one or more of the triggers 224 can be used to determine whether an anomalous event has occurred with regard to the application and/or the VM 302. Such a trigger may compare the performance statistics for the instance of the application running on the VM 302 to be compared with performance statistics for other instances of the application running on other VMs.

In response to determining that one or more triggers have been satisfied, the computing system 308 can identify one or more actions to be performed in association with the application and/or the VM 302 (326). For example, the computing system 206 can identify one or more of the actions 226 to be performed when one or more of the triggers 224 are satisfied. For instance, if a trigger (from the triggers 224) that monitors latency for application B to process requests is satisfied with regard to the instance 208*b* of application B that is running on the VM 202, an associated action can be selected from the actions 226 that, when performed, causes the number of instances of application B to be increased at a rate of one new instance per minute. In a further example, if an anomalous event has been detected with regard to the instance of the application running on the VM 302 and/or with regard to the VM 302 itself, the selected action can include restarting or rebooting the application running on the VM 302, the VM 302 itself, and/or a host machine that is running the VM 302.

The computing system 308 can provide one or more instructions that will cause the identified action to be performed (328). The computing system 308 can provide the one or more instructions to any of a variety of appropriate entities that control the execution of the application, the VM 302, or other VMs, such as the VM 302 (or any component running thereon, such as the agent 306), a host machine 330 that is running the VM 302, and/or another VM 332 that is separate from the VM 302. The instruction can instruct the appropriate entities (e.g., VM 302, host machine 330, and/or other VM 302) to perform the identified action, such as shutting down the VM 302, instantiating another instance of the application (e.g., on the VM 302 and/or the other VM 332), instantiating another VM, and/or allocating more/less computing resources (e.g., processor cycles, network bandwidth, memory) to the application and/or to other applications that are running on the VM 302.

In response to receiving the instruction, the VM 302, host machine 330, the other VM 332, other appropriate entities (e.g., host machines 102-104, host OS 106-108, VMs 110-114), or any combination thereof, can perform the identified action as instructed by the computing system 308 (334). For example, the computing system 118 can instruct the host machine 102 to shut down the VM 110 and can instruct the VM 112 to shut down one or more of the guest applications 112*c*. In another example, the computing system 206 can instruct the VM 204 to instantiate an instance of the application B.

Figure 4:
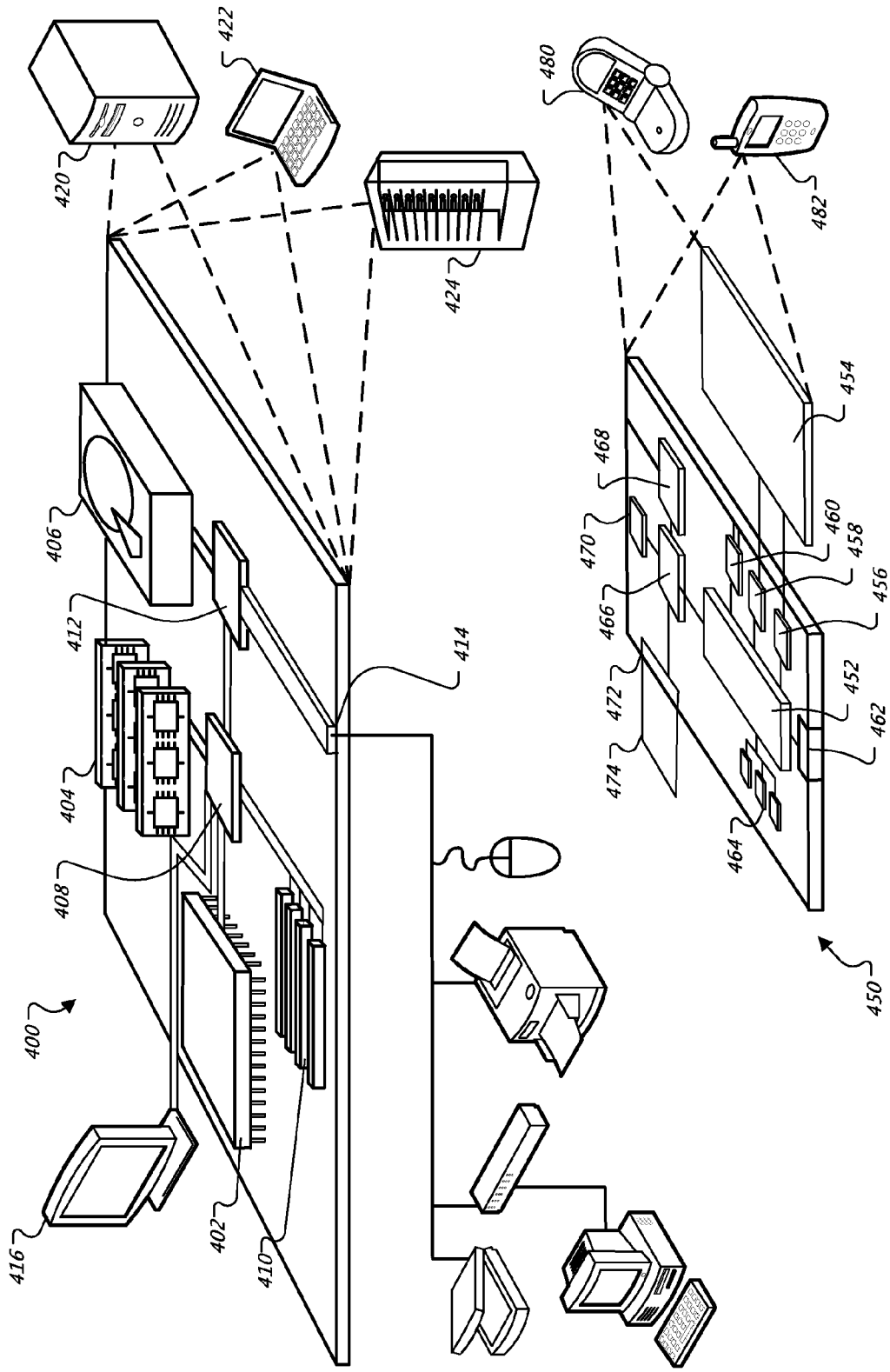
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for monitoring VMs may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, by one or more computing devices and from an agent running on a virtual machine according to a configuration to run an application, application-level performance statistics of the application running on the virtual machine, wherein the application-level performance statistics measure the performance of the application, including a current level of efficiency with which the application is processing requests, the application-level performance statistics being independent of host-level performance statistics that are indicative of the host status of the virtual machine on which the application is running;
determining, using one or more computing devices, whether the application-level performance statistics satisfy one or more triggers of the application, wherein each of the triggers results in one or more actions that are applied to the application, and wherein at least a first trigger is satisfied when the application-level performance statistics are determinative of the application having experienced a performance degradation;
causing at least one of the actions to be performed responsive to the determination of whether the application-level performance statistics satisfy one or more of the triggers, wherein the at least one of the actions performed in response to the first trigger being satisfied comprises causing an additional virtual machine to be instantiated according to the configuration with an instance of the application; and
determining whether the application has experienced an anomalous event responsive to a comparison of the application-level performance statistics of the application to application-level performance statistics of other instances of the application that are running on other virtual machines.

2. The method of claim 1, wherein the at least one of the actions performed comprises causing the virtual machine to be shutdown.

3. The method of claim 1, further comprising aggregating the application-level performance statistics for the application and the virtual machine with application-level performance statistics received for other instances of the application that are running on other virtual machines; wherein the one or more triggers are evaluated and the one or more actions are caused to be performed based on the aggregated application-level performance statistics.

4. The method of claim 1, wherein the application-level performance statistics are repeatedly received by the one or more computing devices and time coded upon receipt; and wherein determining whether the application-level performance statistics satisfy the one or more triggers comprises determining whether application-level performance statistics for the application received over a time period satisfy the one or more triggers.

5. The method of claim 1, wherein the application-level performance statistics include information determining a number of requests received by the application over a period of time.

6. The method of claim 1, wherein the application-level performance statistics include information determining an average latency for the application to process received requests over a period of time.

7. The method of claim 1, wherein the application-level performance statistics include information determining an average amount of data transferred by the application per received request over a period of time.

8. The method of claim 1, wherein the application-level performance statistics include information determining a number of errors encountered by the application over a period of time.

9. The method of claim 1, wherein the application-level performance statistics include information determining a number of items that are currently pending in a task queue for the application.

10. The method of claim 9, wherein the application-level performance statistics include information indicating determining a number of tasks from the task queue that were performed by the application over a period of time.

11. The method of claim 1, wherein the application-level performance statistics include information indicating determining a number of operations taking more than a threshold amount of time to process that are performed by the application over a period of time.

12. The method of claim 11, wherein the operations include database queries.

13. The method of claim 1, further comprising causing the application, the virtual machine, or a host computing device that is running the virtual machine to restart or reboot in response to determining that the anomalous event has occurred.

14. The method of claim 1, wherein the application-level performance statistics are received from the agent running on the virtual machine, the agent obtaining the application-level performance statistics from one or more plugins specific to the application and running on the virtual machine; and wherein the plugins communicate with the application through one or more application programming interfaces used by the application.

15. A computer program product including instructions stored on a non-transitory computer-readable medium that, when executed, cause a processor to perform operations comprising: receiving from an agent running on a virtual machine according to a configuration to run an application, application-level performance statistics of the application running on the virtual machine, wherein the application-level performance statistics measure the performance of the application, including a current level of efficiency with which the application is processing requests, the application-level performance statistics being independent of host-level performance statistics that are indicative of the host status of the virtual machine on which the application is running;
  determining, using one or more computing devices, whether the application-level performance statistics satisfy one or more triggers of the application, wherein each of the triggers results in one or more actions that are applied to the application, and wherein at least a first trigger is satisfied when the application-level performance statistics are determinative of the application having experienced a performance degradation;
  causing at least one of the actions to be performed responsive to the determination of whether the application-level performance statistics satisfy one or more of the triggers, wherein the at least one of the actions performed in response to the first trigger being satisfied comprises causing an additional virtual machine to be instantiated according to the configuration with an instance of the application; and
  determining whether the application has experienced an anomalous event responsive to a comparison of the application-level performance statistics of the application to application-level performance statistics of other instances of the application that are running on other virtual machines.

16. The computer program product of claim 15, wherein the application-level performance statistics are repeatedly received and time coded upon receipt; and wherein determining whether the application-level performance statistics satisfy the one or more triggers comprises determining whether application-level performance statistics for the application received over a time period satisfy the one or more triggers.

17. The computer program product of claim 15, wherein the operations further comprise aggregating the application-level performance statistics for the application and the virtual machine with application-level performance statistics received for other instances of the application that are running on other virtual machines; wherein the one or more triggers are evaluated and the one or more actions are caused to be performed based on the aggregated application-level performance statistics.

18. A system comprising: one or more computer processors; and instructions that, when executed, cause the one or more computing devices to perform operations comprising:
  receiving from an agent running on a virtual machine according to a configuration to run an application, application-level performance statistics of the application running on the virtual machine, wherein the application-level performance statistics measure the performance of the application, including a current level of efficiency with which the application is processing requests, the application-level performance statistics being independent of host-level performance statistics that are indicative of the host status of the virtual machine on which the application is running;
  determining, using one or more computing devices, whether the application-level performance statistics satisfy one or more triggers of the application, wherein each of the triggers results in one or more actions that are applied to the application, and wherein at least a first trigger is satisfied when the application-level performance statistics are determinative of the application having experienced a performance degradation;
  causing at least one of the actions to be performed responsive to the determination of whether the application-level performance statistics satisfy one or more of the triggers, wherein the at least one of the actions performed in response to the first trigger being satisfied comprises causing an additional virtual machine to be instantiated according to the configuration with an instance of the application; and
  determining whether the application has experienced an anomalous event responsive to a comparison of the application-level performance statistics of the application to application-level performance statistics of other instances of the application that are running on other virtual machines.

19. The system of claim 18, wherein the at least one of the actions performed comprises causing the virtual machine to be shutdown.

20. The system of claim 18, wherein the operations further comprise aggregating the application-level performance statistics for the application and the virtual machine with application-level performance statistics received for other instances of the application that are running on other virtual machines; wherein the one or more triggers are evaluated and the one or more actions are caused to be performed based on the aggregated application-level performance statistics.

* * * * *